(12) United States Patent
Suematsu et al.

(10) Patent No.: US 6,634,800 B2
(45) Date of Patent: Oct. 21, 2003

(54) FERRULE FOR OPTICAL CONNECTOR

(75) Inventors: Katsuki Suematsu, Tokyo (JP);
Masato Shiino, Tokyo (JP); Masao Shinoda, Tokyo (JP); Koichi Maeno, Tokyo (JP); Masaaki Takaya, Tokyo (JP); Shinji Nagasawa, Tokyo (JP); Kouji Shibata, Tokyo (JP)

(73) Assignees: Furukawa Electric Co., Ltd., Tokyo (JP); Nippon Telegraph and Telephone Corporation, Tokyo (JP)

( * ) Notice: Subject to any disclaimer, the term of this patent is extended or adjusted under 35 U.S.C. 154(b) by 49 days.

(21) Appl. No.: 09/843,970

(22) Filed: Apr. 27, 2001

(65) Prior Publication Data

US 2001/0053266 A1 Dec. 20, 2001

(30) Foreign Application Priority Data

Apr. 27, 2000 (JP) .................................. 2000-128372
May 18, 2000 (JP) .................................. 2000-146220

(51) Int. Cl.$^7$ ................................................. G02B 6/36
(52) U.S. Cl. ............................................ 385/80; 385/77
(58) Field of Search ................................. 385/77, 80

(56) References Cited

U.S. PATENT DOCUMENTS 5,923,803 A * 7/1999 Bunin et al. .................. 385/80
6,409,394 B1 * 6/2002 Ueda et al. .................... 385/80

* cited by examiner

Primary Examiner—Audrey Chang
Assistant Examiner—Denise S. Allen
(74) Attorney, Agent, or Firm—Knobbe, Martens, Olson & Bear, LLP

(57) ABSTRACT

In an optical connector ferrule comprising an insertion opening through which one end of a coated optical fiber with the coating removed is inserted. A guide groove is provided for guiding the bare fiber of the optical fiber. A fiber hole is provided for inserting therein the bare fibers guided by the guide groove. An injection port is provided for injecting therein adhesive for securing the coated optical fiber to the ferrule. Guide surfaces are provided for guiding the bare fiber to the guide grooves at sides of the guide groove. In the similar optical connector ferrule, there is provided an enlarged portion extending forwardly from a leading edge of the injection port in a fiber inserting direction and reaching a filling space into which the adhesive is filled. Further, a ceiling surface of the enlarged portion is inclined downwardly forwardly from the injection port.

9 Claims, 9 Drawing Sheets

FERRULE FOR OPTICAL CONNECTOR

BACKGROUND OF THE INVENTION

1. Field of the Invention

The present invention generally relates to a ferrule for an optical connector used in a connecting portion between optical fibers or a connecting portion of an optical module such as an optical semiconductor, and more particularly, it relates to an MT connector ferrule.

2. Description of the Related Art

FIG. 9 shows an example of a conventional ferrule for an optical connector (referred to as "ferrule"). The ferrule shown in FIG. 9 is used for interconnecting optical fibers or for connecting an optical fiber to a connecting portion of an optical module by attaching the ferrule to an end of a coated optical fiber A having four bare fibers C. As shown in FIG. 9, the ferrule is provided with an insertion opening B through which the bare fibers C (from which the coating is removed) are inserted. The bare fibers C are further inserted into two or more fiber holes D. Guide grooves E are provided for guiding the bare fibers C into each of the fiber holes D. An injection port F is provided for injecting adhesive for securing the coated optical fiber A to the ferrule. Guide pin holes G are provided for insertion of guide pins (not shown) for positioning two ferrules abutting against each other.

In order to assemble an optical connector by using the ferrule shown in FIG. 9, the bare fibers C (from which the coating is removed) are inserted through the insertion opening B into respective guide grooves E. The bare fibers C may be inserted into the fiber holes D by pushing the coated optical fiber A along the guide grooves E in the direction toward the fiber holes D. The adhesive is injected through the injection port F to secure the coated optical fiber A to the ferrule.

The conventional ferrule shown in FIG. 9 has the following disadvantages.

(1) As shown in FIG. 10, flat portions J exist between both end guide grooves E in an arrangement direction (widthwise direction) and inner wall surfaces H of the ferrule. When the bare fibers C are dropped into the guide grooves E from above, one of both end bare fibers C may ride on the flat portion J, thereby making it difficult to drop all of the bare fibers C into the respective guide grooves E. Although a condition that the right end bare fiber C rides on the right end flat portion J is shown, the left end bare fiber C may ride on the left end flat portion J.

(2) As shown in FIG. 10, the inner wall surfaces H of the ferrule are shown to rise vertically from the flat portions J. As a result, when the adhesive is injected through the injection port F (see FIG. 9), the adhesive may be cured while bubbles remain in corners K between the flat portions J and the inner wall surfaces H. In such a case, since the bubbles are expanded or contracted due to change in surrounding temperature, optical property and adhesion strength are deteriorated.

In order to eliminate the disadvantages of the ferrule shown in FIG. 9, a ferrule as shown in FIG. 11 has been proposed. In the ferrule shown in FIG. 11, the inner wall surfaces H of the ferrule rise vertically from lateral edges of both end guide grooves E to eliminate flat portions J as shown in FIG. 10. However, the ferrule shown in FIG. 11 has the disadvantages provided below.

(1) A distance between the both end guide grooves E is substantially equal to the opposed inner wall surfaces H. Since the inner wall surfaces H are not spaced apart from each other adequately, it is difficult to insert the bare fibers C between them, thereby worsening the operability.

(2) Since a contact area between the adhesive and the ferrule is decreased, the adhesion strength is reduced, and consequently the pulling strength for the fiber becomes insufficient.

FIG. 12 shows a further example of a conventional ferrule. The ferrule shown in FIG. 12 is also used for interconnecting optical fibers or for connecting an optical fiber to a connecting portion of an optical module by attaching the ferrule to an end of a coated optical fiber A having four bare fibers C. As shown in FIG. 12, the ferrule is provided with an insertion opening B through which the bare fibers C (from which the coating is removed) are inserted. Two or more fiber holes $D_1$ are provided for inserting the bare optical fibers C. Minute holes $D_2$ are provided for inserting distal ends of the bare fibers C. Guide grooves E are provided for guiding the bare fibers into the each fiber holes $D_1$. A filling space L is provided to be filled by adhesive for securing the coated optical fiber A to the ferrule. The adhesive M (FIG. 13B) is inserted through an injection port F to fill in the filling space L. Guide pin holes G are provided to insert guide pins (not shown) for positioning two ferrules abutting against each other.

In order to assemble an optical connector by using the ferrule shown in FIG. 12, as shown in FIG. 13A, the bare fibers C (from which the coating is removed) are inserted through the insertion opening B. The inserted bare fibers C are dropped into respective guide grooves E. As shown in FIG. 13B, the coated optical fiber A is pushed into the ferrule until the a predetermined portion of the bare fibers C protruds from an end face N of the ferrule by a predetermined lengths. Thereafter, the adhesive M is injected into the filling space L (see FIG. 13A) through the injection port F, thereby securing the coated optical fiber A to the ferrule.

The conventional ferrule shown in FIG. 12 had the following disadvantage discussed below.

(1) As shown in FIG. 13A, a forward inner surface O of the filling space L is a vertical surface extending vertically from a leading edge P of the injection port F to start points Q of the fiber holes $D_1$. The volume of the filling space L is small and thus the filling amount of the adhesive M (see FIG. 13B) becomes insufficient. Further, since the guide grooves E terminate at the inner surface O of the filling space L, as shown in FIG. 13B, the amount of the adhesive M filled around the bare fibers C is very small. In addition, since the diameters of the fiber holes D, are small, the adhesive M may not be filled in the fiber holes. For these reasons, pulling strength of the fiber becomes insufficient, and a fiber securing force is reduced because of deterioration of adhesive particularly due to change in temperature and a high humidity environment.

In order to eliminate this problem, as shown in FIG. 14, a ferrule in which the injection port F is extended in the fiber inserting direction to increase the volume of the filling space L has been proposed. However, the ferrule shown in FIG. 14 has the following disadvantages.

(1) Since the injection port F is positioned near the end face N of the ferrule, the symmetry in the vicinity of the end face N is worsened. As a result, it is difficult to achieve the accuracy at the sub-micron level required for the optical connector ferrule.

(2) Since a ratio of cavity to the entire ferrule is increased because of increased volumes of the injection port and the filling space, physical strength of the ferrule is decreased. As a result, a camber may be generated in the ferrule due to change in surrounding temperature.

SUMMARY OF THE INVENTION

In one embodiment, the invention provides an optical connector ferrule comprising an insertion opening through which one end of a coated optical fiber with the coating removed is inserted. The ferrule further comprises guide grooves for guiding the bare fibers inserted through the insertion opening, fiber holes into which the bare fibers guided by the guide grooves are inserted. The ferrule further comprises an injection port through which adhesive for securing the coated optical fiber to the ferrule is injected. A guide surface or guide surfaces for guiding the bare fibers to guide groove is or are formed at one or both sides of the guide grooves in a width-wise direction thereof, and each guide surface is inclined downwardly toward the corresponding guide grooves.

According to another embodiment, the invention provides an optical connector ferrule comprising an insertion opening through which one end of a coated optical fiber with the coating removed is inserted. The ferrule further compries guide grooves for guiding the bare fibers inserted through the insertion opening, and fiber holes into which the bare fibers guided by the guide grooves are inserted. The ferrule further comprises an injection port through which adhesive for securing the coated optical fiber to the ferrule is injected, and a filling space into which the adhesive injected through the injection port is filled. An enlarged portion extending from a distal end of the injection port is formed in front of the filling space in an optical fiber inserting direction.

According to a further embodiment, the invention provides an optical connector ferrule comprising an insertion opening through which one end of a coated optical fiber with the coating removed is inserted. The ferrule further comprises guide grooves for guiding the bare fibers inserted through the insertion opening, and fiber holes into which the bare fibers guided by the guide grooves are inserted. The ferrule further comprises an injection port through which adhesive for securing the coated optical fiber to the ferrule is injected, and a filling space into which the adhesive injected through the injection port is filled. An enlarged portion extending from a distal end of the injection port is formed in front of the filling space in an optical fiber inserting direction, and a ceiling surface of the enlarged portion is inclined downwardly forwardly from the injection port.

DETAILED DESCRIPTION OF THE INVENTION (First Embodiment)

Figure 1:
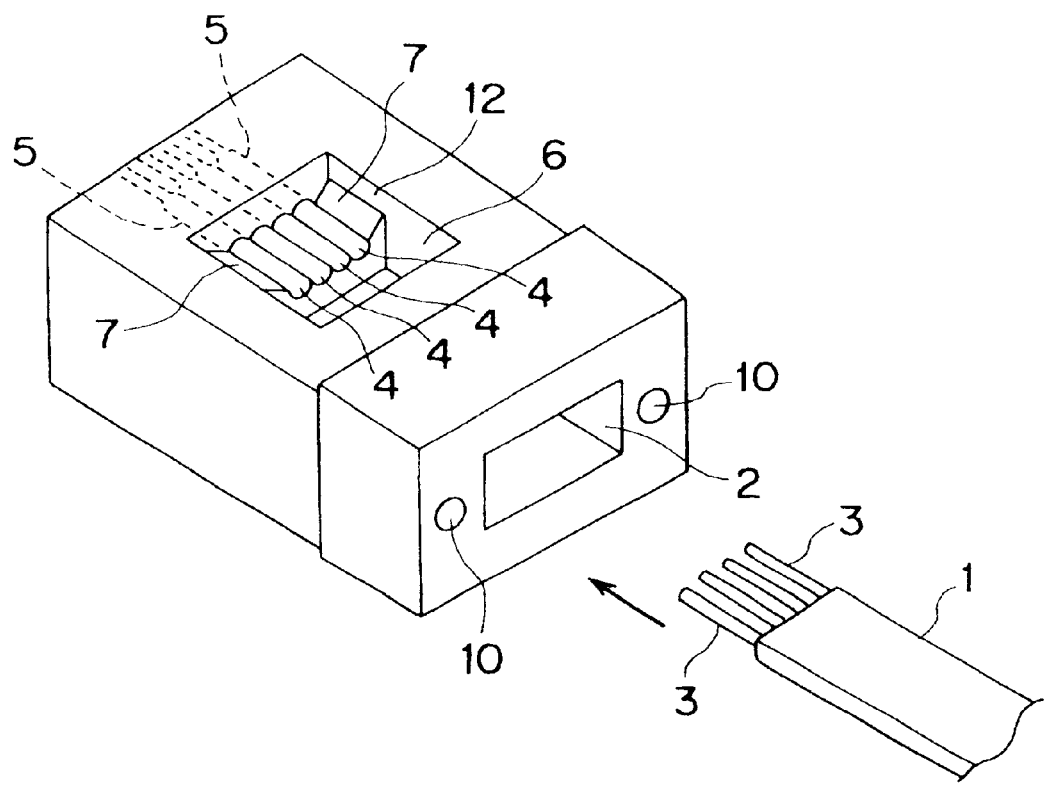
FIG. 1 is a perspective view of an optical connector ferrule according to a first embodiment of the present invention.
Figure 2:
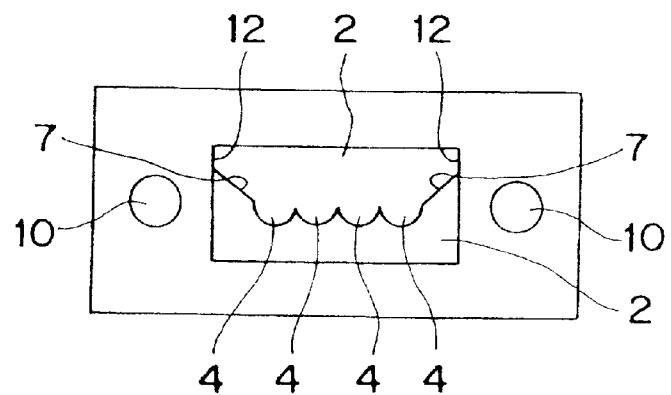
FIG. 2 is a side end view of the optical connector ferrule shown in FIG. 1, looked at from an insertion opening side.
Figure 3:
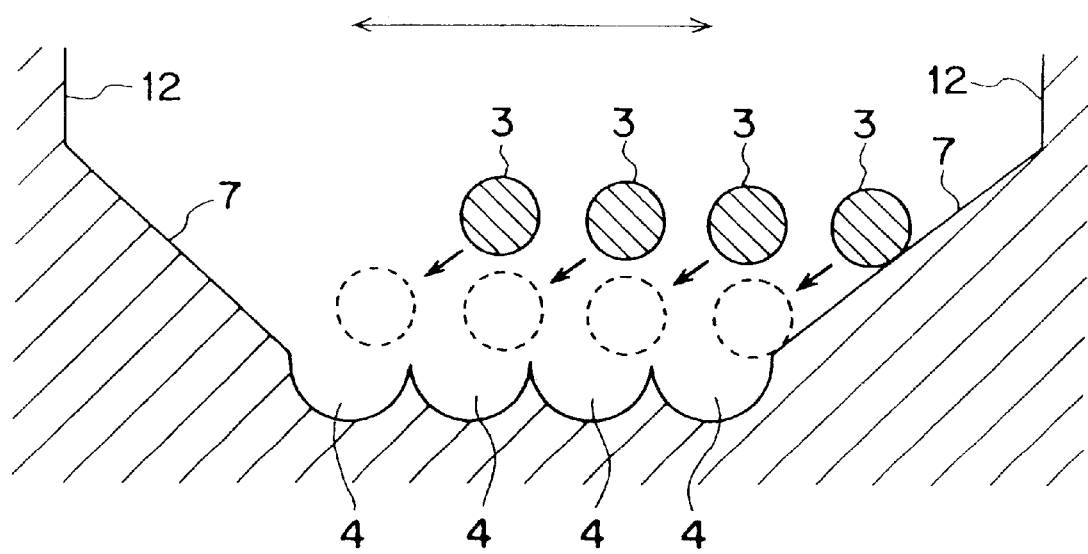
FIG. 3 is an enlarged view showing guide grooves of the optical connector ferrule shown in FIG. 1 and therearound.

According to a first embodiment of the invention, an optical connector ferrule (hereinafter referred to as "ferrule") is explained with reference to FIGS. 1 to 3. The ferrule shown in FIGS. 1 to 3 is used for interconnecting optical fibers or for connecting an optical fiber to a connecting portion of an optical module by attaching the ferrule to an end of a coated optical fiber 1 having four bare fibers 3. As shown in FIG. 1, the ferrule is provided with an insertion opening 2 through which the bare fibers 3 (from which the coating is removed) are inserted. The bare optical fibers 3 are inserted into four fiber holes 5 through the insertion opening 2. Four guide grooves 4 are provided for guiding the bare fibers 3 through the insertion opening 2 to reach the predetermined fiber holes 5. An injection port 6 is provided for injecting adhesive for securing the coated optical fiber 1 to the ferrule. Guide pin holes 10 are provided for inserting guide pins (not shown) for positioning two ferrules abutting against each other. Further, as shown in FIG. 2, guide surfaces 7 for guiding the bare fibers 3 into the predetermined guide grooves 4 are formed and beginning at lateral sides of both end (end-most) guide grooves 4 and extending to inner wall surfaces 12 of the ferrule in an arrangement direction.

Figure 9:
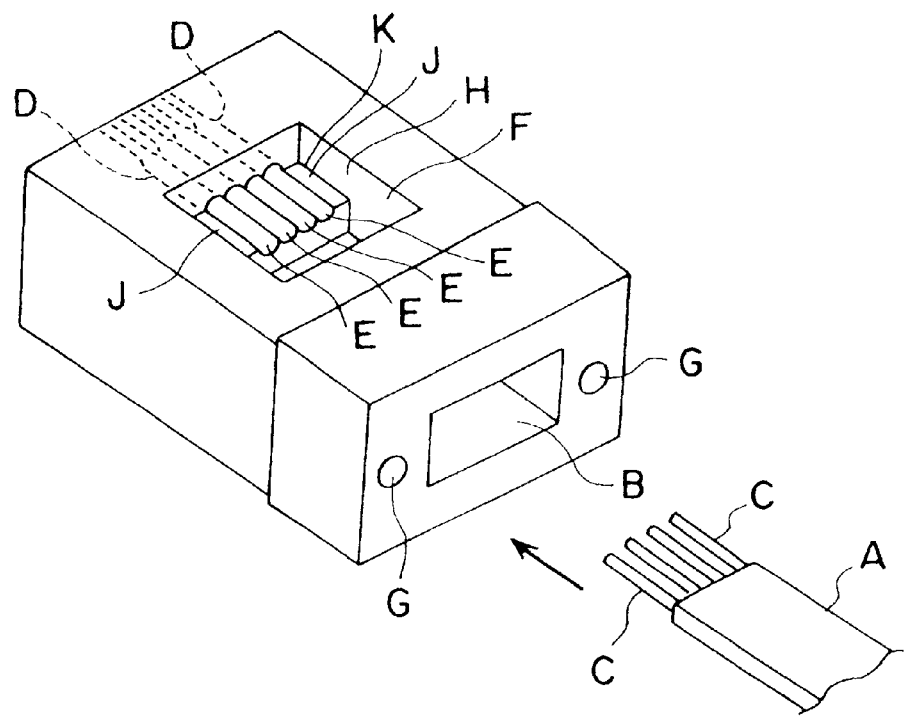
FIG. 9 is a perspective view showing an example of a conventional optical connector ferrule.

The insertion opening 2, fiber holes 5, guide grooves 4, injection port 6 and guide pin holes 10, shown in FIG. 1, are the same as those of the conventional ferrule shown in FIG. 9.

As shown in FIG. 2, the guide surfaces 7 are gradually flared upwardly and outwardly from both end guide grooves 4 in the arrangement direction so that the guide surfaces are inclined downwardly toward the corresponding end-most guide grooves 4. Further, as shown in FIG. 1, the guide surfaces 7 extend along the entire longitudinal length of each guide groove 4.

Figure 10:
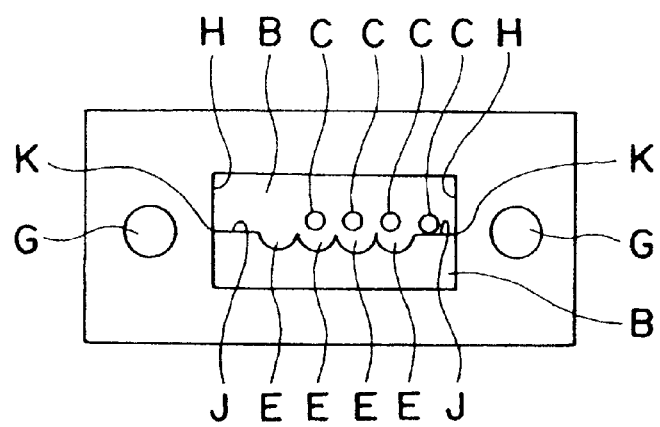
FIG. 10 is a side end view of the optical connector ferrule shown in FIG. 9, looked at from an insertion opening side.
Figure 11:
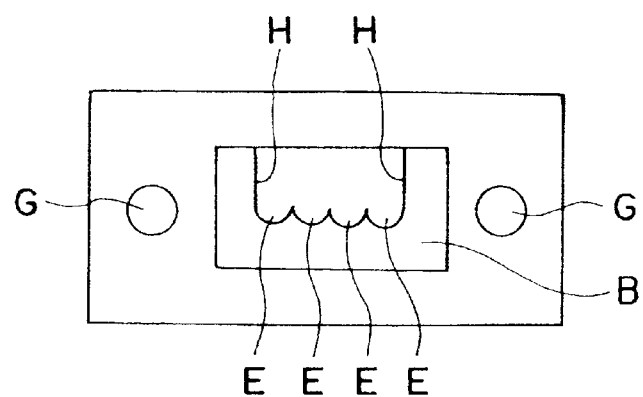
FIG. 11 is an end view of a conventional optical connector ferrule different from that shown in FIG. 9, looked at from an insertion opening side.

As shown in FIG. 1, the bare fibers 3 are inserted through the insertion opening 2 and the inserted bare fibers 3 are dropped into the guide grooves 4. If the bare fibers 3 deviated to one of directions shown by the double-headed arrow in FIG. 3 (i.e., in the arrangement direction of the bare fibers 3), either one of the bare fibers 3 at both ends in the arrangement direction can be guided into the nearest corresponding guide groove (predetermined guide groove 4) along the guide surface 7. As a result, the remaining bare fibers 3 are also automatically shifted laterally in the opposite direction and guided into the corresponding guide grooves 4. Further, when it is assumed that a distance (height) between the guide grooves 4 and the injection port 6 is the same. Since the guide surfaces 7 are flared outwardly, a filling volume of the adhesive is increased in comparison with that in the ferrule shown in FIG. 11. Since the guide surfaces 7 are inclined, a surface area of each guide surfaces 7 becomes greater than the vertical inner wall surface H of the ferrule shown in FIG. 11, thereby resulting in an increased contact area with the adhesive. In addition, since there is not flat portion (corresponding to the flat portions J shown in FIG. 10) between the guide grooves 4 and the guide surfaces 7, the disadvantage of having bubbles remain in the adhesive does not occur when adhesive is filled therein.

(Second Embodiment)

According to a second embodiment of the invention, an optical connector ferrule is fully described with reference to FIG. 4. A fundamental arrangement of the ferrule according to the second embodiment is the same as that in the first embodiment. The difference is as follows. In the ferrule of the first embodiment (shown in FIG. 2), the guide surfaces 7 rise directly from the lateral edges of the guide grooves 4. In this embodiment, a high-skilled technique is used to form such construction with resin. According to the second embodiment, in order to facilitate the manufacture of the ferrule without deteriorating the effect of the first embodiment, flat portions 8 are provided between the lateral edges of the end-most guide grooves 4 and lower ends of the guide surfaces 7.

Figure 4:
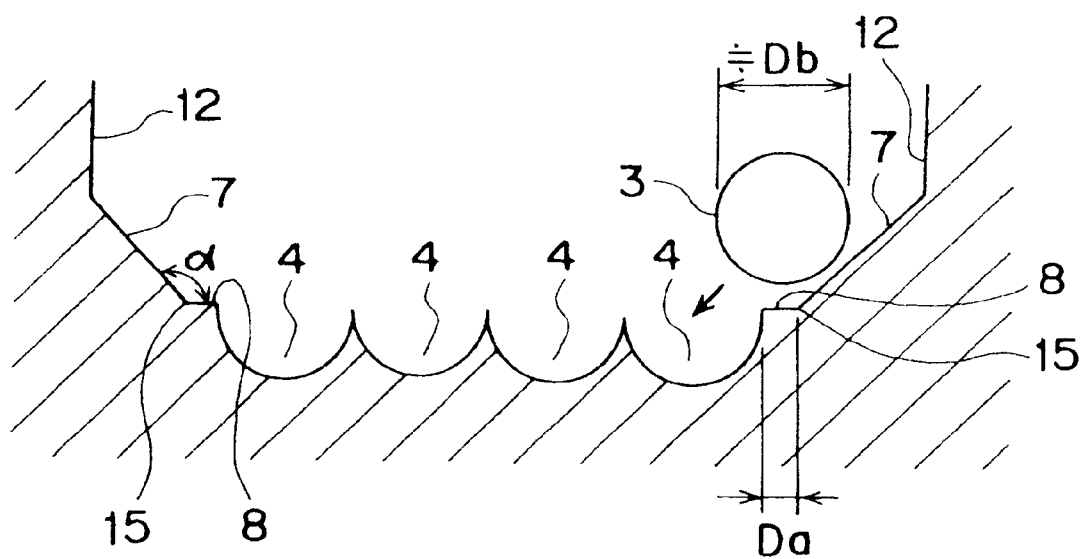
FIG. 4 is an enlarged view showing guide grooves of an optical connector ferrule according to a second embodiment of the present invention.

As shown in FIG. 4, a width (Da) of each flat portion 8 is selected to be smaller than ½ of an inner diameter.(Db) of the fiber hole 5 (see FIG. 1). For example, the width (Da) may be selected to be 50 $\mu$m in the illustrated embodiment). An angle ($\alpha$) between the flat portion 8 and the guide surface 7 is selected to 110°<$\alpha$<160° (e.g., the angle ($\alpha$ may be selected to be 135° in the illustrated embodiment). With this arrangement, since an outer diameter of the bare fiber 3 is 125 $\mu$m which is substantially the same as the inner diameter (Db) of the fiber hole 5, the width (Da) of the flat portion 8 is smaller than the radius (62.5 $\mu$m) of the bare fiber 3. Accordingly, when either one of the bare fibers 3 at both ends in the arrangement direction is guided into the nearest corresponding guide groove 4 (predetermined guide groove 4) along the guide surface 7, the bare fiber 3 does not ride on the flat portion 8 and can be smoothly dropped into the guide groove 4. Since the angle between the flat portion 8 and the guide surface 7 is greater than 90° (obtuse angle), creation of bubbles is avoided in the corners 15 between the flat portions and the guide surfaces, even when adhesive is filled therein.

(Third Embodiment)

Figure 5:
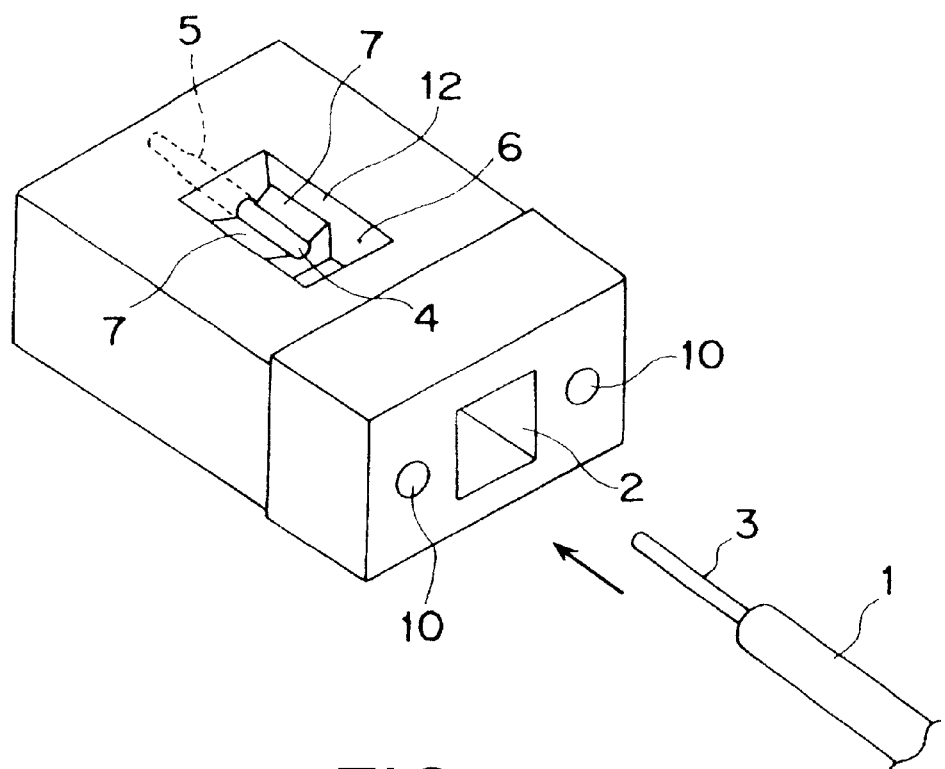
FIG. 5 is a perspective view of an optical connector ferrule according to a third embodiment of the present invention.
Figure 6:
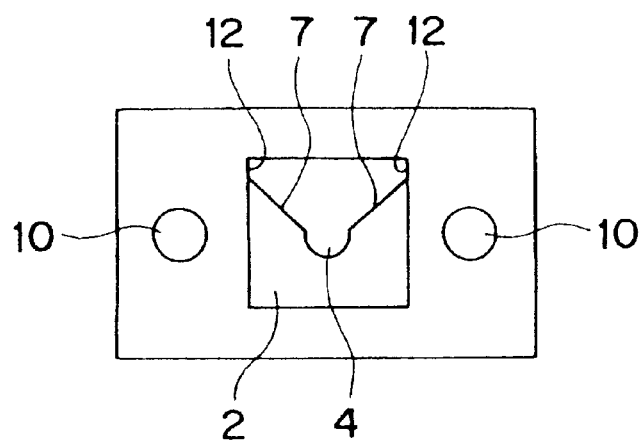
FIG. 6 is an end view of the optical connector ferrule shown in FIG. 5, looked at from an insertion opening side.

According to a third embodiment of the invention, an optical connector ferrule is fully described with reference to FIGS. 5 and 6. As shown in FIGS. 5 and 6, the ferrule has one fiber hole 5 and a guide groove 4 connected therewith to cope with a coated optical fiber 1 having a single bare fiber. In this embodiment of the ferrule, guide surfaces 7 are formed on both sides of the guide groove 4. The other arrangements are the same as those in the first embodiment.

Also in the ferrule according to the third embodiment, flat portions 8 as shown in FIG. 4 may be provided between both lateral edges of the guide groove 4 and the lower ends of the guide surfaces 7 rising therefrom. However, the width of each flat portion 8 and the angle between the flat portion 8 and the guide surface 7 are set within the ranges defined in the second embodiment.

(Fourth Embodiment)

In one embodiment, of the invention, the downwardly inclined guide surface 7 may be provided only at one side of one of end-most guide grooves 4 in the arrangement direction. A vertical ferrule inner wall surface may be provided at the other side of the other end-most guide groove (without providing the guide surface 7). Further, a cross-sectional configuration of each guide groove 4 may be a V-shape, in place of U-shape. Further, in the above-mentioned first to third embodiments, while an example that the ferrule is attached to the optical fiber having four bare fibers or single bare fiber was explained, the present invention can be applied to ferrules to be attached to any optical fibers having other number of bare fibers.

(Fifth Embodiment)

Figure 7:
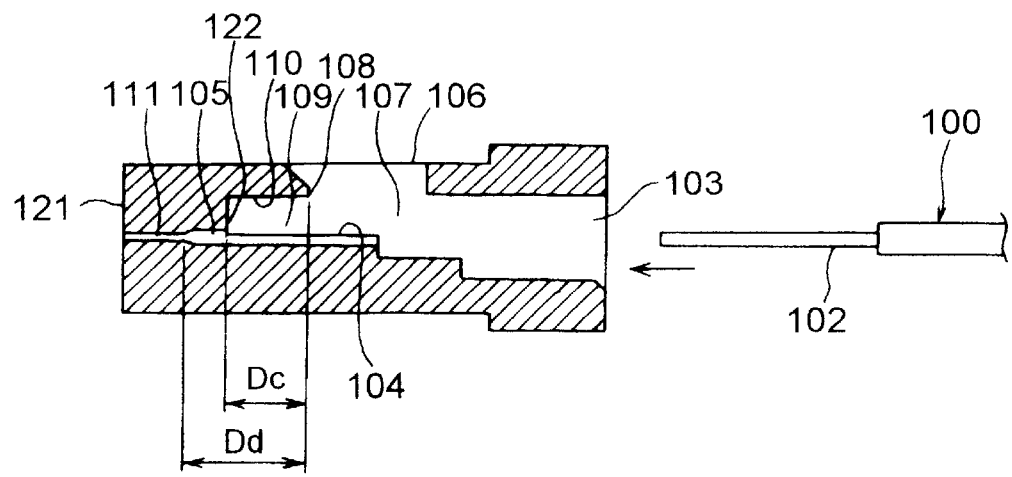
FIG. 7 is a perspective view of an optical connector ferrule according to a fourth embodiment of the present invention.
Figure 12:
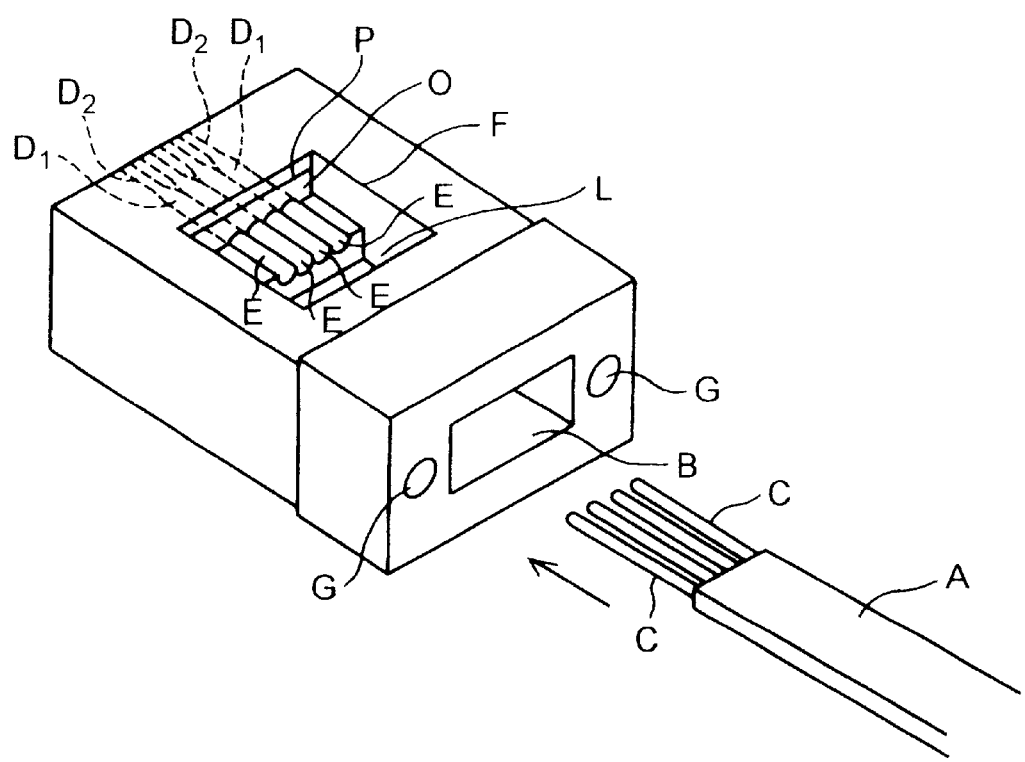
FIG. 12 is an explanatory sectional view showing another example of a conventional optical connector ferrule.
Figure 13A:
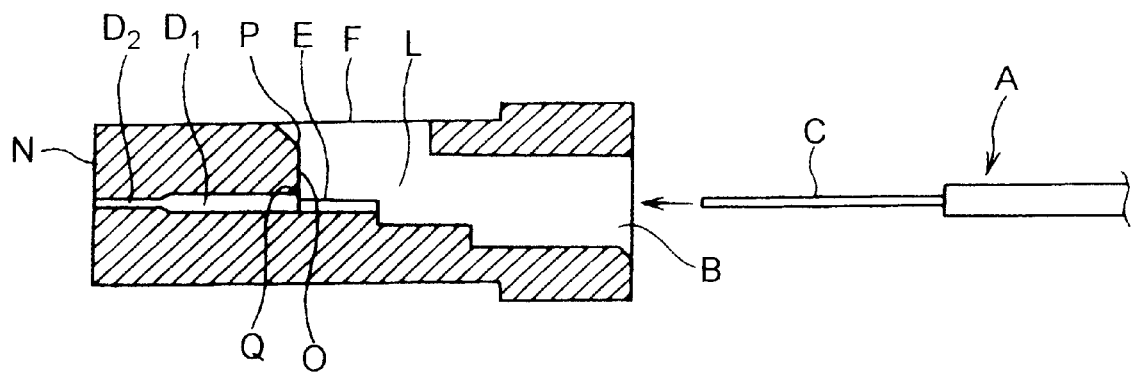
FIG. 13A is an explanatory sectional view showing the optical connector ferrule of FIG. 12, illustrating a condition before adhesive is filled.
Figure 13B:
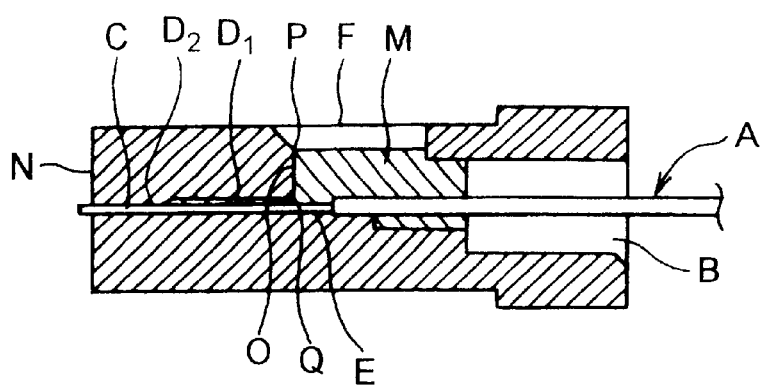
FIG. 13B is a view illustrating a condition after the adhesive was filled.

According to a fifth embodiment of the invention, the ferrule is fully described with reference to FIG. 7. The ferrule shown in FIG. 7 is used for interconnecting optical fibers or for connecting an optical fiber to a connecting portion of an optical module by attaching the ferrule to an end of a coated optical fiber having four bare fibers. This ferrule has the same appearance as that of the ferrule shown in FIG. 12. This ferrule is provided with an insertion opening 103 for inserting the bare fibers 102 (from which the coating is removed) of one end of the coated optical fiber 100. Guide grooves 104 are provided for guiding the inserted bare fibers 102. Fiber holes 105 are provided for inserting the guided bare optical fibers 102 therein. Minute holes 111 connected to the corresponding fiber holes 105 are provided for inserting distal ends of the bare fibers 102. A filling space 107 is provided for injecting therein adhesive through an injection port 106. Guide pin holes (not shown) are provided for inserting therein guide pins (not shown) for positioning two ferrules abutting against each other. These elements are the same as those of the ferrule shown in FIG. 12.

Figure 14:
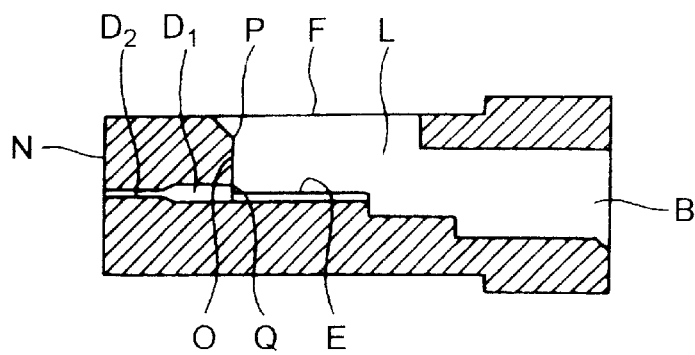
FIG. 14 is an explanatory sectional view showing a conventional optical connector ferrule different from that shown in FIG. 12.

As shown in FIG. 7, a volume of the filling space 107 is increased without widening the injection port 106 toward an end face 121 of the ferrule. An enlarged portion 109 is formed extending forwardly (toward the end face 121) from a front edge 108 of the injection port 106 in a fiber inserting direction, and reaching the filling space 107. With this arrangement, unlike to the ferrule shown in FIG. 14, the filling space 107 having adequate volume can be realized without distorting symmetry in the vicinity of the end face 121 of the ferrule and reducing the physical strength of the entire ferrule. Further, in this embodiment, the guide grooves 104 are extended into the enlarged portion 109. With this arrangement, the adequate amount of adhesive can be filled around the bare fibers 102 supported in the guide grooves 104.

Figure 15:
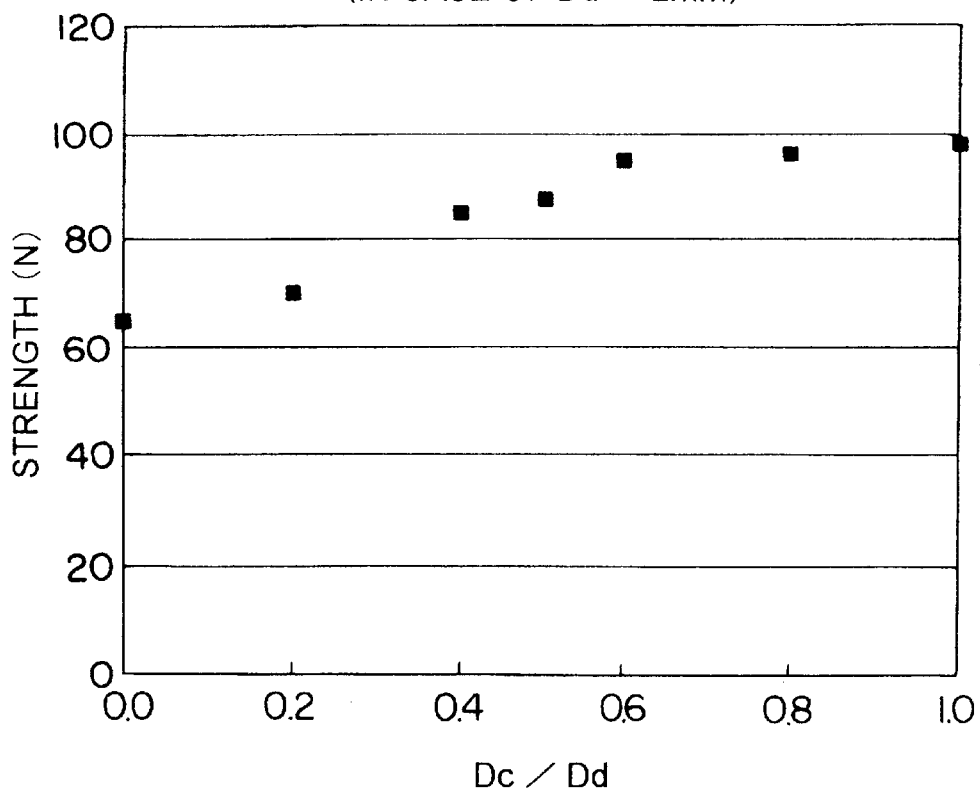
FIG. 15 is a graph showing a result of a pulling strength test for a fiber.

As shown in FIG. 7, it is desirable that a length of the enlarged portion 109 (e.g., dimension Dc from the front edge 108 of the injection port 106 to a front inner surface 122 of the enlarged portion 109 in the fiber inserting direction) be greater than 40% of a dimension (Dd) from the front edge 108 to a starting end of the minute holes 111. In this embodiment, the dimension Dd is selected to be 2 mm and the dimension Dc is selected to be 1 mm. FIG. 15 is a graph showing a relationship between Dc/Dd and fiber pulling strength. From the graph shown in FIG. 15, it can be seen that, when Dc/Dd>0.4 (i.e. when Dc is greater than 40% of Dd), the fiber pulling strength greater than 80 N can be obtained. Incidentally, 80 N is strength required for satisfying stable property of the optical connector in various reliability tests.

(Sixth Embodiment)

Finally, according to a sixth embodiment of the invention, the ferrule is fully described with reference to FIG. 8.

Fundamentally, the construction of this ferrule is the same as that in the fifth embodiment. As shown in FIG. 8, the difference is illustrated by a ceiling surface 110 of the enlarged portion 109, which is inclined downwardly from the injection port 106 toward the forward direction. With this arrangement, when the adhesive is filled in the filling space 107 and bubbles are generated in the enlarged portion 109, such bubbles are shifted (ascended) toward the injection port 106 along the ceiling surface 110 for discharge through the injection port 106. As a result, the adhesive is not cured while any bubbles remain in the filling space 107 including the enlarged portion 109. This eliminates the problem of deterioration of optical property and adhesion strength due to expansion/contraction of bubble in the event of a change in environmental temperature.

Figure 8:
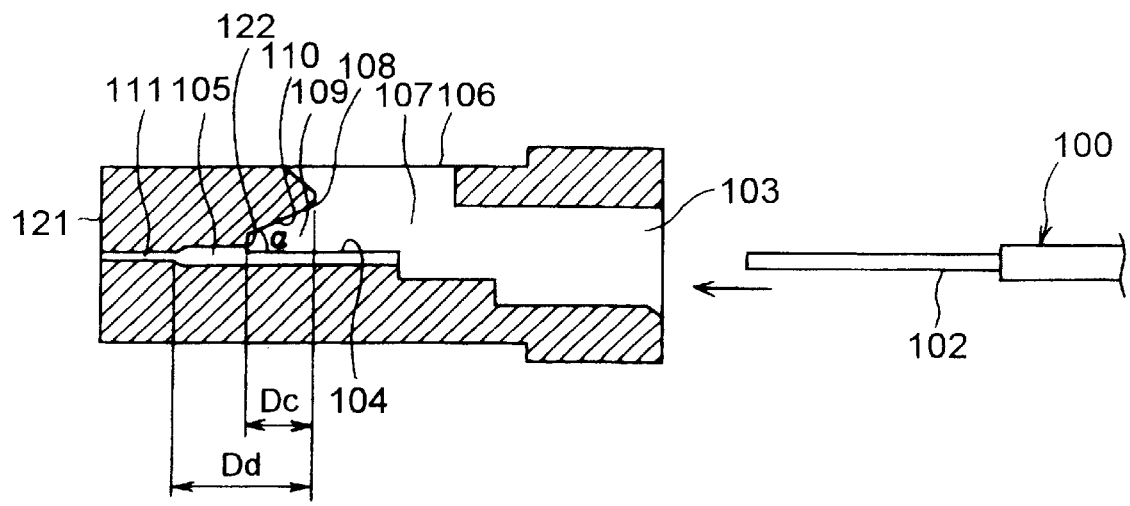
FIG. 8 is an end view of an optical connector ferrule according to a fifth embodiment of the present invention, looked at from an insertion opening side.

As shown in FIG. 8, it is desirable that the ceiling surface 110 be formed so that an angle ($\alpha$) between a plane defined by the guide grooves 104 and the ceiling surface 110 becomes greater than 10°. In this embodiment, the angle is selected to be 20°.

As in the fifth embodiment, the length (Dc) of the enlarged portion 109 is selected to be greater than 40% the length (Dd), which represents the distance from the front edge 108 of the injection port 106 to the minute holes 111.

Effects of Invention

The optical connector ferrule according to the invention achieves at least one of the following effects (1) to (12):

(1) Since the guide surface(s), which is/are capable of guiding the bare fibers into the predetermined guide grooves are formed at one or both sides of the guide grooves in the width-wise direction, the bare fiber(s) can be dropped into the predetermined guide groove(s) easily and positively, thereby improving the operability. This result is achieved in the case of plural bare fibers and in the case of single bare fiber.

(2) The guide surfaces are inclined downwardly inwardly toward the guide grooves. Since a distance between the upper ends of the opposed guide surfaces is greater than the width of the bare fiber in case of single fiber and than a distance between both end-most fibers in case of plural fibers, the bare fiber or fibers can easily be introduced between the guide surfaces. Further, as long as the bare fiber(s) are introduced between the guide surfaces, the bare fiber(s) can be dropped into the predetermined guide groove(s) easily and positively by the above effect (1).

(3) Since the guide surfaces are inclined, the filling volume and the contact area with respect to the adhesive can be increased without changing the outer dimension of the ferrule. Accordingly, in the optical connector, the fiber pulling strength does not become insufficient.

(4) In the case where the guide surfaces rise directly from the lateral edges of the guide grooves, any bubbles are released from the corners between the guide grooves and the guide surfaces during filling of the adhesive. This eliminates the problem of deterioration of optical property and adhesion strength due to expansion/contraction of bubble.

(5) Since the flat portions are formed between the guide grooves and the guide surfaces, the ferrule having the above effects can easily be formed.

(6) Since the width (Da) of the flat portion is smaller than ½ of the inner diameter (Db) of the fiber hole, the fiber to be dropped into the guide groove does not ride on the flat portion and can be dropped smoothly into the guide groove.

(7) Since the angle between the flat portion and the guide surface is greater than 110° and smaller than 160°, even when the fat portion is provided, any bubble are released from the corner between the flat portion and the guide surface. Accordingly, the ferrule can be formed easily. Also, this eliminates the problem of deterioration of optical property and adhesion strength due to expansion/contraction of bubble in the event of a change in the environmental temperature. Further, the above-mentioned angle range is preferable for easy dropping of the bare fibers into the guide grooves and the adhesion strength.

(8) By forming the enlarged portion extending forwardly from the front edge of the injection port in the fiber inserting direction and reaching the filling space, the volume of the filling space is increased without widening the injection port toward the end face of the ferrule. Accordingly, unlike conventional ferrules, the filling space having the adequate volume can be obtained without distoring the symmetry in the vicinity of the end face and reducing the entire physical strength. As a result, an optical connector having adequate pulling strength can be realized.

(9) Since the ceiling surface of the enlarged portion is inclined downwardly forwardly from the injection port, any bubbles generated in the enlarged portion are shifted (ascended) toward the injection port along the inclined ceiling surface and are discharged therefrom, when the adhesive if filled therein. Accordingly, the adhesive is not cured as bubbles remain in the filling space. This eliminates the problem of deterioration of optical property and adhesion strength due to expansion/contraction of bubble in the event of a change in the environmental temperature.

(10) Since the guide grooves are extended into the enlarged portion, the adhesive can be filled adequately around the bare fibers supported in the guide grooves, thereby realizing the optical connector having further adequate pulling strength.

(11) Since the length of the enlarged portion is greater than 40% of the length between the front edge of the injection port and the minute holes, the fiber pulling strength generally required for the optical connectors can be realized positively.

(12) Since the ceiling surface of the enlarged portion is formed so that the angle between the plane defined by the guide grooves and the ceiling surface becomes greater than 10°, the bubbles generated in the enlarged portion can be discharged more positively and smoothly.

What is claimed is:

1. An optical connector ferrule comprising:

an insertion opening through which one end of a coated optical fiber with the coating removed is inserted;

a guide grove for guiding said bare fiber inserted through said insertion opening;

a fiber hole into which said bare fibers guided by said guide groove is inserted, and an injection port through which adhesive for securing said coated optical fiber to the ferrule is injected, and wherein a guide surface or guide surfaces for guiding said bare fiber to guide groove is or are formed at one or both sides of said guide groove in a width-wise direction thereof, arid each guide surface is inclined downwardly toward said guide groove, and wherein a flat surface having a width smaller than ½ of an inner diameter of said fiber hole is formed between said guide groove and said guide surface.

2. An optical connector ferrule according to claim 1, wherein an angle between said flat portion and said guide surface is greater than 110° and smaller than 160°.

3. An optical connector ferrule comprising:

an insertion opening through which one end of a coated optical fiber with the coating removed is inserted;

a guide groove for guiding said bare fiber inserted through said insertion opening;

a fiber hole into which said bare fiber guided by said guide groove is inserted;

an injection port through which adhesive for securing said coated optical fiber to the ferrule is injected; and a filling space into which the adhesive injected through said injection port is filled, wherein an enlarged portion extending from a distal end of said injection port is formed in front of said filling space in an optical fiber inserting direction, and a ceiling surface of said enlarged portion is inclined downwardly forwardly from said injection port.

4. An optical connector ferrule according to claim 3, wherein said guide groove is extended into said enlarged portion of the filling space.

5. An optical connector ferrule according to claim 4, wherein a minute hole capable of inserting said bare fiber therein is formed on a distal end of said fiber hole, and a length of said enlarged portion of said filling space is greater than 40% of a distance from a leading end of said injection port to said minute hole.

6. An optical connector ferrule according to any one of claims 3 to 5, wherein an angle between a plane defined by said guide groove and said ceiling surface of said enlarged portion of said filling space is greater than 10°.

7. An optical connector ferrule according to claim 3, wherein a minute hole capable of inserting said bare fiber therein is formed on a distal end of said fiber hole, and a length of said enlarged portion of said filling space is greater than 40% of a distance from a leading end of said injection port to said minute hole.

8. An optical connector ferrule according to claim 7, wherein an angle between a plane defined by said guide groove and said ceiling surface of said enlarged portion of said filling space is greater than 10°.

9. An optical connector ferrule comprising:

an insertion opening through which one end of a coated optical fiber with the coating removed is inserted;

a guide groove for guiding said bare fiber inserted through said insertion opening;

a fiber hole into which said bare fiber guided by said guide groove is inserted;

an injection port through which adhesive for securing said coated optical fiber to the ferrule is injected; and a filling space into which the adhesive injected through said injection port is filled, wherein an enlarged portion extending from a distal end of said injection port is formed in front of said filling space in an optical fiber inserting direction, and wherein a minute hole capable of inserting said bare fiber therein is formed on a distal end of said fiber hole, and a length of said enlarged portion of said filling space is greater than 40% of a distance from a leading end of said injection port to said minute hole.

* * * * *

UNITED STATES PATENT AND TRADEMARK OFFICE
CERTIFICATE OF CORRECTION

PATENT NO. : 6,634,800 B2
DATED : October 21, 2003
INVENTOR(S) : Suematsu et al.

It is certified that error appears in the above-identified patent and that said Letters Patent is hereby corrected as shown below:

<u>Title page,</u>
Item [73], Assignees, please delete "Furukawa Electric Co., Ltd." and insert therefor
-- The Furukawa Electric Co., Ltd. --.

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,634,800 B2
DATED : October 21, 2003
INVENTOR(S) : Suematsu et al.

It is certified that error appears in the above-identified patent and that said Letters Patent is hereby corrected as shown below:

Column 8,
Line 57, please delete "arid" and insert therefor, -- and --.

Signed and Sealed this

Sixteenth Day of November, 2004

JON W. DUDAS
*Director of the United States Patent and Trademark Office*